(12) United States Patent
Webb et al.

(10) Patent No.: US 9,909,697 B2
(45) Date of Patent: Mar. 6, 2018

(54) PIPE COUPLING WITH DYNAMIC AXIAL RESTRAINT SYSTEM

(71) Applicant: Taylor Kerr (Couplings) Limited, Old Beaconsfield, Buckinghamshire (GB)

(72) Inventors: Ian Richard Webb, Gerrards Cross (GB); Neil John Thornton Taylor, Rickmansworth (GB)

(73) Assignee: Taylor Kerr (Couplings) Limited, Buckinghamshire (GB)

( * ) Notice: Subject to any disclaimer, the term of this patent is extended or adjusted under 35 U.S.C. 154(b) by 0 days.

(21) Appl. No.: 14/916,956

(22) PCT Filed: Sep. 4, 2014

(86) PCT No.: PCT/GB2014/052678
§ 371 (c)(1),
(2) Date: Mar. 4, 2016

(87) PCT Pub. No.: WO2015/033142
PCT Pub. Date: Mar. 12, 2015

(65) Prior Publication Data
US 2016/0195205 A1    Jul. 7, 2016

(30) Foreign Application Priority Data

Sep. 6, 2013  (GB) .................................. 1315975.1

(51) Int. Cl.
*F16L 17/00* (2006.01)
*F16L 21/06* (2006.01)
(Continued)

(52) U.S. Cl.
CPC .............. *F16L 21/065* (2013.01); *F16L 21/08* (2013.01); *F16L 47/12* (2013.01); *F16L 59/145* (2013.01); *F16L 59/182* (2013.01)

(58) Field of Classification Search
USPC ....... 285/417, 373, 113, 110, 104, 223, 345, 285/419
See application file for complete search history.

(56) References Cited

U.S. PATENT DOCUMENTS

| 1,930,194 A | * | 10/1933 | Dillon | ..................... F16L 17/04 285/104 |
| 2,209,235 A | * | 7/1940 | Nathan | ................. F16L 17/025 277/615 |

(Continued)

FOREIGN PATENT DOCUMENTS

| DE | 3926626 A1 | 10/1990 |
| DE | 43 44 800 A1 | 6/1995 |

(Continued)

OTHER PUBLICATIONS

International Search Report from the European Patent Office of International Application No. PCT/GB2014/052678, mailed Oct. 28, 2014, pp. 1-3.

(Continued)

*Primary Examiner* — Aaron Dunwoody
(74) *Attorney, Agent, or Firm* — White and Williams LLP

(57) ABSTRACT

A pipe coupling for connecting together the ends of two pipes including a tubular casing for fitting around a pipe; tensioning means for tightening the casing around the outer surface of the pipe; and a dynamic axial restraint system comprising at least one resilient gripping ring mounted within the casing for gripping the outer surface of the pipe. The gripping ring includes an outer surface engaging with an inner surface of the casing and adapted to roll against the inner surface of the casing upon axial loading of the pipe; and an inner gripping surface for engaging the outer surface of the pipe. The gripping surface of the resilient gripping ring is adapted such that upon rolling of the outer surface (Continued)

against the inner surface of the tubular casing, the area of the gripping surface in contact with the pipe increases.

13 Claims, 2 Drawing Sheets

(51) Int. Cl.
*F16L 59/18* (2006.01)
*F16L 21/08* (2006.01)
*F16L 47/12* (2006.01)
*F16L 59/14* (2006.01)

(56) References Cited

U.S. PATENT DOCUMENTS

| | | | | |
|---|---|---|---|---|
| 2,346,051 | A * | 4/1944 | Seamark | F16L 37/0925 285/104 |
| 3,163,432 | A * | 12/1964 | De Boer | F16L 17/025 277/602 |
| 3,400,954 | A * | 9/1968 | Brown | F16L 21/022 277/616 |
| 3,477,750 | A | 11/1969 | Powell | |
| 3,684,317 | A * | 8/1972 | Kazienko | F16L 47/08 277/625 |
| 3,724,880 | A | 4/1973 | Seiler | |
| 4,018,461 | A * | 4/1977 | Bram | F16J 15/32 277/604 |
| 4,466,640 | A | 8/1984 | Van Houtte | |
| 4,629,217 | A * | 12/1986 | Straub | F16L 17/02 285/112 |
| 4,729,582 | A * | 3/1988 | Zeidler | F16L 17/04 285/104 |
| 5,580,100 | A | 12/1996 | Umezawa et al. | |
| 6,070,914 | A * | 6/2000 | Schmidt | F16L 17/04 285/112 |
| 6,206,434 | B1 * | 3/2001 | Schreiter | F16L 17/04 285/104 |
| 6,749,232 | B2 * | 6/2004 | Wachter | F16L 21/08 285/104 |
| 7,748,753 | B2 * | 7/2010 | Krausz | F16L 17/04 285/104 |
| 7,789,431 | B2 * | 9/2010 | Freudendahl | F16L 21/04 285/104 |
| 7,997,626 | B2 * | 8/2011 | Krausz | F16L 21/022 285/110 |
| 8,091,932 | B2 * | 1/2012 | Nijsen | F16L 21/04 285/104 |
| 9,285,060 | B2 * | 3/2016 | Griggs, III | F16L 17/04 |
| 2001/0009332 | A1 * | 7/2001 | Trichard | F16L 37/0925 285/104 |
| 2002/0135184 | A1 | 9/2002 | Snyder, Sr. et al. | |
| 2003/0085566 | A1 * | 5/2003 | Rex | F16L 21/04 285/104 |
| 2005/0067836 | A1 | 3/2005 | Copeland | |
| 2005/0218605 | A1 | 10/2005 | Walworth et al. | |
| 2007/0052230 | A1 * | 3/2007 | Kramer | F16L 27/107 285/223 |
| 2012/0274063 | A1 | 11/2012 | Kennedy, Jr. | |

FOREIGN PATENT DOCUMENTS

| | | |
|---|---|---|
| EP | 0 205 896 A2 | 12/1986 |
| EP | 0 542 779 A1 | 5/1993 |
| EP | 0 900 346 B1 | 3/1999 |
| EP | 0 959 286 A2 | 11/1999 |
| GB | 2 177 177 A | 1/1987 |
| GB | 2 275 089 A | 8/1994 |
| GB | 2 275 090 A | 8/1994 |
| KR | 20120075809 A | 7/2012 |
| WO | 2010035924 A1 | 4/2010 |

OTHER PUBLICATIONS

Results of a pre-filing search of corresponding Great Britain Application No. GB 1315975.1, carried out by Applicant, from the United Kingdom Intellectual Property Office, dated Apr. 3, 2014, p. 1.
United Kingdom Search Report, Patent Seekers, issued on the UK priority application, dated Jul. 17, 2013, pp. 1-7.

* cited by examiner

PIPE COUPLING WITH DYNAMIC AXIAL RESTRAINT SYSTEM

CROSS-REFERENCE TO RELATED APPLICATIONS

This application claims priority to International Application No. PCT/GB2014/052678, filed Sep. 4, 2014, which claims the benefit of Great Britain Application No. 1315975.1, filed Sep. 6, 2013, the disclosures of which are incorporated herein by reference in their entirety.

BACKGROUND OF THE INVENTION

The present invention relates to a pipe coupling having a dynamic axial restraint to system for anchoring pipes to lock them axially together. The invention finds particular application in the connection of plastic pipes.

A wide variety of pipe couplings for connecting together two pipe ends in a fluid tight manner are known. The fluid pressure in a pipeline tends to force the pipe ends apart and known pipe couplings incorporate an arrangement for securing the pipes against axial movement relative to the coupling upon axial loading of the pipes.

For example, EP-A-0 542 779 discloses a pipe coupling incorporating a frusto-conical gripping ring with inwardly projecting gripping teeth, which is located within a circumferential slot provided in the outer surface of the sealing gasket. In use, when the coupling is tightened around the pipe, the gripping teeth penetrate the sealing gasket at the bottom of the slot and engage the outer surface of the pipe to hold the pipe ends against axial displacement. As the axial load on the pipe increases, the frusto-conical gripping ring tends to flatten, causing the teeth to bite deeper into the pipe surface, improving the grip.

The sustained use of this type of axial restraint system including a gripping ring may additionally cause some degradation of the pipe, due to the gripping teeth cutting into the pipe surface. This is not problematic for metallic pipes but in the case of softer metal or plastic pipes, it has been found that such a system can only withstand relatively moderate levels of axial loading over a long period, in particular when a plastic pipe is subjected to variations in temperature.

Furthermore, at high levels of axial loading, the gripping ring will tend to rotate away from the outer surface of the pipe, which reduces the level of grip. Eventually, the gripping ring may flip over and lose contact with the pipe entirely. Where the pipe is formed of a relatively thin material, the rotation of the gripping ring relative to the pipe surface may additionally cause deformation of the cross-sectional shape of the pipe end.

There is a strong demand for plastic pipes for high pressure applications. However, it has been observed that some thermoplastic materials used for forming pipes will deform upon the application of stress and over time, the plastic will tend to move to a point of lower stress or resistance. This means that in the region of a pipe coupling, the prolonged application of radial pressure by the gripping ring clamped around the pipe will cause the plastic to migrate or 'creep' away from the gripping teeth to an adjacent area of lower stress. As the plastic migrates away from the gripping ring, the gripping teeth are unable to retain a sufficiently strong grip on the pipe surface.

It would therefore be desirable to provide a novel pipe coupling having an axial restraint system that provides improved gripping of the pipe surface and improved resistance to axial movement of the pipe ends. It would be particularly desirable to provide such a novel pipe coupling that provides improved axial restraint for plastic pipes and that performs better than known pipe couplings under high axial loads.

SUMMARY OF THE INVENTION

A pipe coupling for connecting together the ends of two pipes including a tubular casing for fitting around a pipe; tensioning means for tightening the casing around the outer surface of the pipe; and a dynamic axial restraint system comprising at least one resilient gripping ring mounted within the casing for gripping the outer surface of the pipe. The gripping ring includes an outer surface engaging with an inner surface of the casing and adapted to roll against the inner surface of the casing upon axial loading of the pipe; and an inner gripping surface for engaging the outer surface of the pipe. The gripping surface of the resilient gripping ring is adapted such that upon rolling of the outer surface against the inner surface of the tubular casing, the area of the gripping surface in contact with the pipe increases.

BRIEF DESCRIPTION OF THE DRAWINGS

Aspects of the invention will now be described, by way of example, with reference to the accompanying drawings, in which.

DETAILED DESCRIPTION OF THE DRAWINGS

Figure 1:
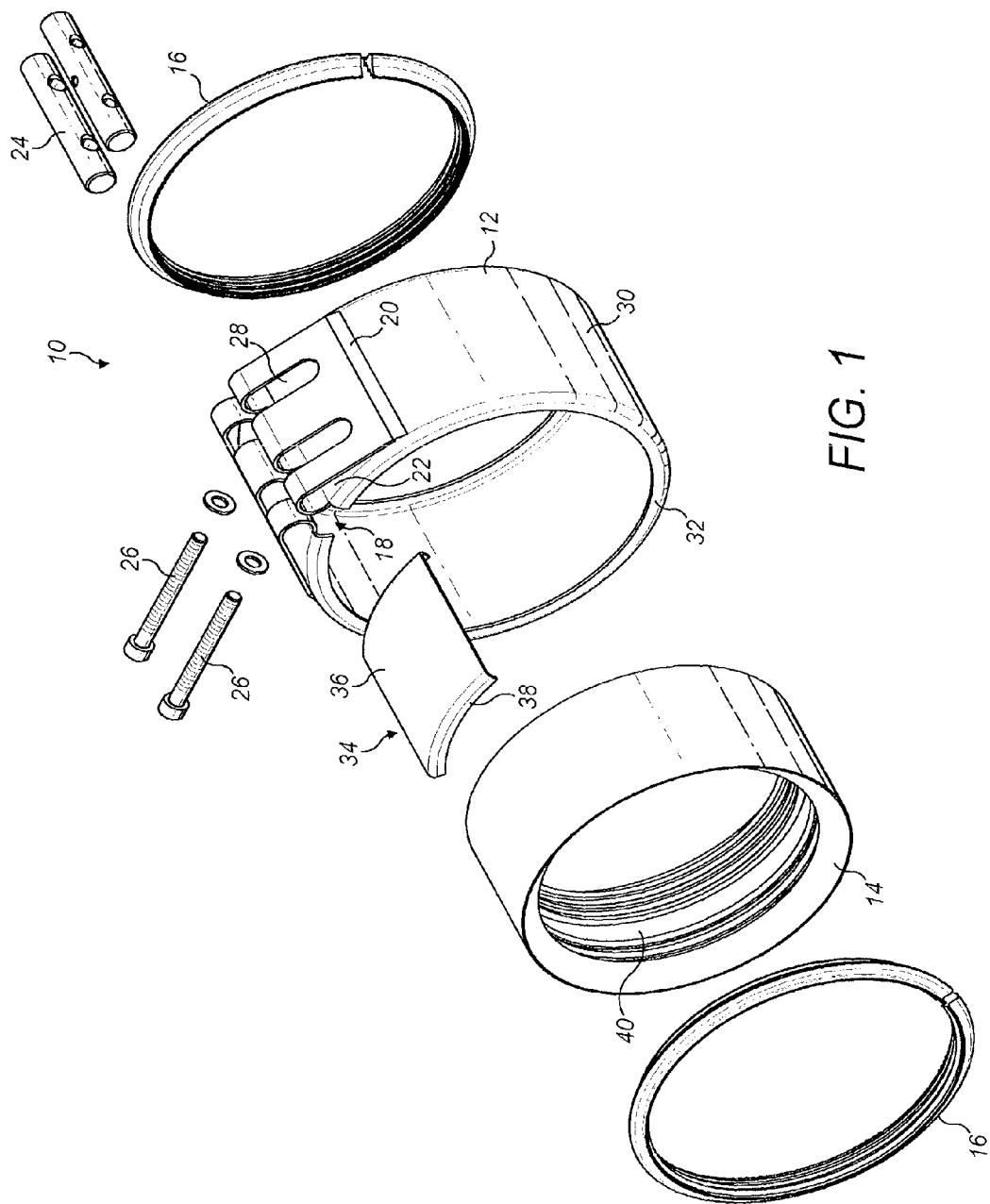
FIG. 1 shows an exploded perspective view of a coupling in accordance with an aspect of the invention.

According to the invention there is provided a pipe coupling for connecting together the ends of two pipes, the pipe coupling comprising: a tubular casing for fitting around a pipe; a tubular sealing sleeve located within the casing; tensioning means for tightening the casing around the sealing sleeve to seal the sealing sleeve around the outer surface of the pipe; and a dynamic axial restraint system. The dynamic axial restraint system comprises at least one resilient gripping ring mounted within the casing for gripping the outer surface of the pipe. The gripping ring comprises: an outer surface engaging with an inner surface of the casing and adapted to roll against the inner surface of the casing upon axial loading of the pipe; and an inner gripping surface for engaging the outer surface of the pipe, wherein the gripping surface of the resilient gripping ring is adapted such that upon rolling of the outer surface against the inner surface of the tubular casing, the area of the gripping surface in contact with the pipe progressively increases.

In the following specification, the term "axial" is used to refer to the direction defined by the longitudinal axis of the pipe and the term "radial" is used to refer to a direction defined by a radius of the pipe.

The pipe coupling of the present invention incorporates a dynamic axial restraint system having a gripping ring that is able to adapt to a higher level of axial loading on the pipe by rolling relative to the casing such that a larger area of the inner gripping surface of the gripping ring is brought into engagement with the outer surface of the pipe. The gripping ring therefore improves its grip on the pipe under high axial loads by increasing the surface area of the ring that grips the pipe, rather than forcing the gripping ring deeper into the pipe surface, as with the gripping rings of the prior art. This means that the level of radial stress to which the pipe is subjected by the pipe coupling of the invention is significantly lower than for known pipe couplings.

The pipe coupling of the present invention is particularly suitable for use in the coupling of plastic pipes since the increase in the gripping area upon increased axial loading enables the axial restraint system to more effectively withstand the migration of the plastic from the regions of high stress and thereby maintain a strong axial restraint whilst retaining a low level of radial stress. The axial restraint system additionally reduces the level of cutting of the gripping ring into the pipe surface, which reduces the degradation of the relatively soft plastic pipe.

The pipe coupling of the present invention is suitable for use in the coupling of pipes formed from a variety of plastic materials including but not limited to polyvinyl chloride (PVC), chlorinated polyvinyl chloride (CPVC), high density polyethylene (HDPE), medium density polyethylene (MDPE), polypropylene (PP), acrylonitrile butadiene styrene (ABS). The pipe coupling of the present invention is also suitable for use in the coupling of metal pipes.

The gripping ring of the pipe coupling of the invention must be sufficiently resilient that the shape of the gripping ring can dynamically adapt so that the rolling of the outer surface against the inner surface of the casing and the progressive engagement of the inner gripping surface against the pipe can be achieved all of the way around the circumference of the pipe. The gripping ring may be formed of any suitable resilient material including a metal such as brass or aluminium, a rubber, or a plastic. The gripping ring may be formed as a single annular piece, or may be formed of a plurality of arcuate segments, which together form a complete ring.

The gripping ring can advantageously be incorporated into a variety of types and sizes of pipe coupling without the need for significant modification of the casing or sealing sleeve of the coupling.

As described above, the pipe coupling is adapted such that the outer surface of the gripping ring engages with the inner surface of the tubular casing, and rolls against that surface upon the application of axial loading to the pipe. In preferred embodiments of the invention, the gripping ring has a convex outer surface which engages with the inner surface of the tubular casing. In such embodiments, the gripping ring has a unique cross-sectional shape that provides a curved outer surface that is able to roll against the inner surface of the tubular casing surface upon the application of axial loading to the pipe.

In the present specification, the term "convex" is used to describe the curvature of the outer surface of the gripping ring, wherein the convex form of the outer surface means that the surface curves away from the central axis of the ring between the axial edges of the outer surface. This convex shape enables the outer surface to roll along the inner surface of the casing, which will typically be flat in an axial direction. The degree of curvature and the shape of the curved surface may vary depending on the desired movement of the gripping ring. The outer surface may curve symmetrically or asymmetrically between the axial edges.

It will be appreciated that in alternative embodiments of the invention, the arrangement may be reversed such that the tubular casing has a convex inner surface which engages with the outer surface of the gripping ring, which will typically be substantially flat in an axial direction. In such embodiments, the outer surface of the gripping ring will still roll against the inner surface of the casing upon axial loading of the pipe, as described above.

The inner gripping surface may take any form that is suitable for providing a sufficiently strong grip on the outer surface of the pipe. The inner gripping surface may be adapted depending on the size and material of the pipe.

Preferably, the inner gripping surface of the resilient gripping ring comprises a first annular projection having a gripping edge for engaging with the outer surface of the pipe in an initial position of the gripping ring and a second annular projection having a gripping edge, wherein the second annular projection is axially offset from the first annular projection. The second annular projection is adapted such that its gripping edge is brought into engagement with the outer surface of the pipe upon rolling of the outer surface of the gripping ring against the inner surface of the tubular casing.

This arrangement of a first and second annular projection provides a secure grip on the pipe, which adapts so that as the axial loading on the pipe increases, the grip also increases, thereby providing an improved resistance against axial movement of the pipe. The first and second annular projections are arranged such that upon fitting of the pipe coupling of the invention the first annular projection is brought into engagement with the outer surface of the pipe so that the gripping edge of the first annular projection grips or bites the surface and secures the pipe against axial movement. In this initial position, the second annular projection is offset from the outer surface of the pipe and does not provide any gripping function.

The first annular projection remains engaged with the outer surface of the pipe at all times and under low axial loading provides a sufficient grip on the pipe surface to withstand the axial forces. As the axial loading on the pipe increases and axial forces act to pull the pipe away from the pipe coupling, the gripping ring will move relative to the coupling in such a way that the outer surface rolls along the inner surface of the coupling, as described above. As the outer surface rolls against the coupling, the position and shape of the gripping ring adapts to bring about a rolling movement of the inner surface relative to the outer surface of the pipe, such that the second annular projection is brought towards the outer surface. At a certain level of axial loading, the gripping edge of the second annular projection will be brought into engagement with the outer surface of the pipe. In this position, the gripping edges of both the first and second annular projections will be gripping the pipe to provide an increased strength of axial locking.

The first and second annular projections are axially offset from each other, so that the gripping edges are spaced apart from each other along the length of the pipe. The distance between the first and second annular projections may be adjusted to ensure that the gripping edge of the second annular projection is brought into engagement with the outer surface of the pipe at an appropriate threshold of axial loading.

In the initial position of the gripping ring, prior to the application of axial loading, the gripping edge of the second annular projection is offset from the gripping edge of the first annular projection so that it does not come into contact with the outer surface of the pipe. In certain embodiments, the second annular projection is radially offset from the first annular projection to achieve the radial offset of the second gripping edge. For example, the inner gripping surface may be curved or stepped between the first annular projection and the second annular projection.

In preferred embodiments of the invention, the height of the second annular projection is less than the height of the first annular projection, such that the gripping edge of the second annular projection projects to a lesser extent from the inner gripping surface, thereby providing the necessary radial offset of the gripping edges. The "height" of the annular projections corresponds to the perpendicular distance between the gripping edge and the base of the annular projection at the inner gripping surface. Where the annular projections are of a different height to each other, they may or may not also be radially offset as described above.

One or more additional annular projections may be provided on the inner gripping surface, spaced apart from the first and second annular projections. For example, in certain preferred embodiments of the invention, the inner gripping surface of the resilient gripping ring comprises a first annular projection having a gripping edge for engaging with the outer surface of the pipe in an initial position of the gripping ring, as described above, and a plurality of additional annular projections each having a gripping edge, wherein the plurality of additional annular projections are progressively offset from the first annular projection in an axial direction. The additional annular projections are adapted such that the gripping edges thereof are progressively brought into engagement with the outer surface of the pipe upon rolling of the outer surface of the gripping ring against the inner surface of the casing.

Moving away from the first annular projection, the gripping edge of each annular projection is radially offset relative to the previous gripping edge so that the radial distance between the gripping edges and the outer surface of the pipe increases with each successive annular projection. This provides a staggered arrangement of the gripping edges. The gripping edges are therefore successively brought into contact with the outer surface of the pipe, with increasing rolling movement of the outer surface of the gripping ring relative to the inner surface of the casing of the pipe coupling.

The inner gripping surface is adapted such that once brought into engagement with the outer surface of the pipe, the gripping edges of the plurality of annular projections remain in place gripping the pipe irrespective of the movement of the gripping ring to engage subsequent annular projections. As the axial loading increases, the number of gripping edges that are gripping the pipe therefore increases to provide increased restraint against axial movement.

Preferably, the annular projections are uniformly spaced apart from each other in the axial direction, although in certain embodiments, a non-uniform spacing between the annular projections may be suitable.

As described above with respect to the first and second annular projections, the radial offset between adjacent annular projections may be achieved through a radial offsetting of the annular projections, or a reduction in the height of successive annular projections, or both. Preferably, the additional annular projections are of progressively decreasing height compared to the first annular projection such that the gripping edges define a substantially frustoconical gripping surface.

In a particularly preferred embodiment, the inner gripping surface comprises three annular projections which are uniformly spaced apart from each other in the axial direction and are of a successively decreasing height.

The gripping edge of each annular projection is adapted so that the edge is capable of gripping the outer surface of the pipe to a sufficient extent to secure the pipe against axial movement. The form of the gripping edge can therefore be adapted according to the material of the pipe. In certain embodiments, it may be advantageous to provide each annular projection with a plurality of teeth which bite into the pipe surface. Alternatively and preferably, each annular projection has a triangular cross-sectional shape, with an apex of the triangle defining the annular gripping edge. This shape provides a relatively sharp edge that is capable of embedding into the surface of the outer pipe as well as strength and stability of the annular projection.

Preferably, the inner gripping surface further comprises an annular channel defined behind each annular projection. This arrangement has been found to be particularly advantageous for plastic pipes, where there is typically a problem with the migration of the plastic material away from regions of high stress, as discussed above. With the pipe coupling of the present invention, the plastic material at the pipe surface will tend to migrate or 'creep' away from the gripping edges of the annular projections where the applied stress is greatest. Where the inner gripping surface comprises an annular channel behind each annular projection, the plastic material will naturally move into the annular channel as it moves away from the adjacent annular projection.

Unlike with the pipe couplings of the prior art, this migration of the plastic material will, however, tend to increase the resistance against axial movement rather than decrease it, since the displaced plastic material abuts the face of the annular projection adjacent to the annular channel and provides further resistance against the axial movement of the pipe relative to the pipe coupling. In other words, the migration of the plastic material increases the engagement of the outer surface of the plastic pipe with the inner gripping surface of the gripping ring so that the 'creep' behaviour of the plastic material over time is in fact used to improve the function of the pipe coupling.

The axial restraint system is mounted within the tubular casing of the pipe coupling of the invention, so that the at least one gripping ring is tightened around the outer surface of the pipe when the pipe coupling is put in place. The way in which the axial restraint system is mounted within the casing will depend upon the form and construction of the casing and the presence of other components, such as a sealing sleeve, within the casing.

Preferably, the tubular casing is of generally U-shaped cross-section having a web portion with circumferentially extending flanges projecting radially inwardly from the axial ends of the web portion to define an annular channel. The at least one resilient gripping ring is mounted in this annular channel, at an axial end of the casing, such that the outer surface of the at least one gripping ring is adapted to roll against the inner surface of the web portion upon axial loading of the pipe. Preferably, the at least one gripping ring additionally abuts the inner surface of the flange of the casing at the corresponding axial end, wherein the abutment of the gripping ring with the flange retains the gripping ring in position within the casing.

The axial restraint system may comprise a single gripping ring mounted at an axial end of the tubular casing. Alternatively and preferably, the axial restraint system comprises a pair of resilient gripping rings mounted in the annular channel at opposite axial ends of the casing and in abutment with the inner surfaces of the opposed flanges of the casing. A gripping ring is therefore provided at each axial end of the pipe coupling, to optimise the gripping of the pipe.

Preferably, each gripping ring comprises an annular flange projecting out through the corresponding axial end of the casing. The annular flange of the gripping ring is adapted to limit the rolling movement of the outer surface of the gripping ring relative to the inner surface of the casing through abutment with the free edge of the corresponding flange of the casing.

The tubular casing will typically be formed of a strip of metal or other material formed into a tube with a gap extending longitudinally of the casing between the free ends of the strip, wherein the free ends of the strip are interconnected by tensioning means. In certain embodiments of the invention, the pipe coupling may further comprise a bridging member fitted within the tubular casing and positioned to span the longitudinal gap in the casing. The bridging member will therefore typically be formed in a part-cylindrical shape with a radius of curvature similar to that of the casing. The casing on either side of the longitudinal gap preferably overlaps with the bridging member.

In certain embodiments of the invention, the tubular casing may alternatively comprise an outer casing and an inner casing which is fitted within the outer casing. Preferably, the inner casing is fitted entirely within the outer casing. The outer casing and inner casing preferably both have longitudinal gaps wherein the gap in the inner casing is circumferentially offset from the gap in the outer casing. Unlike the bridging member described above, the inner casing extends around substantially the full circumference of the pipe coupling. A suitable arrangement of outer and inner casings would be known to the skilled person and is described, for example, in GB-A-2 275 089, which is hereby incorporated by reference in its entirety.

Preferably, a layer of fire-resistant thermally-insulating material is disposed between the inner and outer casings whereby the inner and outer casings are thermally insulated from one another. This feature enables a fire-resistant pipe coupling to be provided which can withstand extremely high temperatures without deterioration. Details of a suitable fire shield for incorporating into the pipe coupling of the present invention can be found, for example, in EP-A-0 900 346, which is hereby incorporated by reference in its entirety.

The use of a bridging member or inner casing ensures that the one or more gripping rings and the sealing sleeve, where present, are supported around their entire periphery. This arrangement has advantageously been found to increase the pressure capability of the pipe coupling of the invention, such that it can withstand even higher fluid pressures.

Preferably, each gripping ring further comprises a plurality of inwardly projecting teeth for engaging the outer surface of the pipe, wherein the plurality of teeth are circumferentially spaced around the inner gripping surface of the gripping ring to substantially prevent circumferential movement of the gripping ring around the outer surface of the pipe, i.e. rotation of the ring about the pipe axis. Where the inner gripping surface comprises two or more annular projections, the teeth may be provided separately from the annular projections, or may alternatively be incorporated into one or more of the annular projections. The inwardly projecting teeth preferably extend only part way around the gripping ring.

In preferred embodiments of the present invention, the pipe coupling further comprises a tubular sealing sleeve located within the casing. In use of the pipe coupling, as the casing is tightened around the pipe ends, the casing presses the sealing sleeve against the outer surfaces of the pipe ends to form seals. Suitable sealing sleeves for use in a pipe coupling of this construction will be known to the skilled person.

The sealing sleeve operates independently of the axial restraint system of the pipe coupling. In certain embodiments, the sealing sleeve may, however, abut against the one or more gripping rings and may act to restrain the one or more gripping rings against the tubular casing of the pipe coupling.

The pipe coupling of the invention will typically incorporate tensioning means, such as tensioning bolts, for tightening the casing around the pipe ends. Suitable tensioning means will depend on the form of the casing but will be known to the skilled person.

The pipe coupling 10 of FIG. 1 comprises a tubular casing 12, a sealing sleeve 14 and an axial restraint system comprising two gripping rings 16.

The casing 12 is formed of a rolled steel strip, formed into a tube with a longitudinal gap 18 between the free ends of the strip. The free ends of the strip which forms the casing are folded back on themselves and welded at 20 to form loops 22 along opposite edges of the longitudinal gap 18. Pins 24 are inserted in the loops. Tensioning bolts 26 pass through transverse holes in one of the pins 24 into tapped transverse holes in the other of the pins 24, so as to interconnect the two free ends of the outer casing. Slots 28 are cut into the loops 22 so as to provide clearance for the bolts.

The axial end margins of the casing 12 are bent inwardly at right angles to the tubular web portion 30 of the casing to form flanges 32 projecting inwardly towards the central axis of the casing.

A bridging member 34 of rolled steel is located inside the casing 12 and spans the longitudinal gap 18. The bridging member is curved about the central axis of the casing. The end margins of the bridging member 34 are bent inwardly at right angles to the part-cylindrical web portion 36 of the bridging member to form flanges 38 projecting inwardly towards the central axis of the casing. The casing 12 on either side of the longitudinal gap 18 overlaps the bridging member 34. The axial length of the bridging member 34 is slightly less than that of the casing 12 so that, where they overlap, the flanges 38 of the bridging member 34 fit inside the flanges 32 of the casing 12.

The sealing sleeve 14 is of an elastomeric material, for example, rubber. The inner surface of the sealing sleeve is formed with raised sealing surfaces 40 for contacting the outer surface of the pipe when the pipe coupling 10 is in place. The sealing sleeve 14 fits inside the casing 12 and the bridging member 34 between the gripping rings 16.

A gripping ring 16 is located inside the casing 12 and the bridging member 34 at each axial end of the casing 12. Each gripping ring 16 abuts the inner surface of the flange 32 or flange 38 at that axial end of the casing 12 on one side and an axial edge of the sealing sleeve 14 on the opposite side. The sealing sleeve 14 urges the gripping rings against the corresponding flanges of the casing 12 and bridging member 34 such that the gripping rings are retained in position.

Each gripping ring 16 is made of a resilient material, such as brass and is formed of a single arcuate portion extending circumferentially around the casing 12. A small gap exists between the free ends of the arcuate portion to allow for tightening of the pipe coupling.

Figure 2:
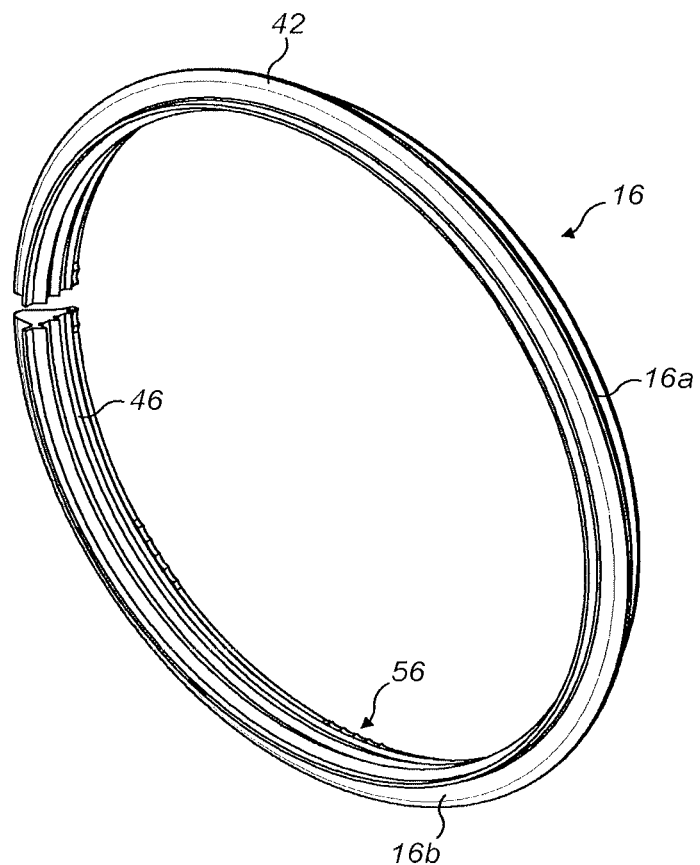
FIG. 2 shows a perspective view of a gripping ring of the coupling of FIG. 1.
Figure 3:
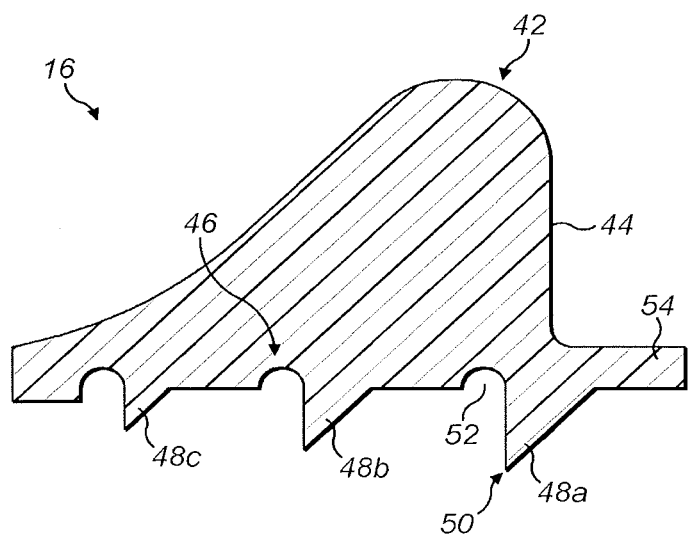
FIG. 3 shows a cross-sectional view of the gripping ring of FIG. 2.

FIGS. 2 and 3 show one of the gripping rings 16 of the pipe coupling 12, which is described in more detail below. The other gripping ring 16 is substantially identical in form and is mounted in a corresponding way at the opposed axial end of the casing 12.

The gripping ring 16 has a convex outer surface 42 which contacts the flat, inner surface of the web portion 30 of the casing 12. The convex outer surface 42 additionally provides an abutting edge 44 which abuts against the inner surface of the adjacent flange 32 or flange 38.

The gripping ring 16 also has an inner gripping surface 46 comprising a first annular projection 48a, a second annular projection 48b and a third annular projection 48c, spaced apart from each other in the axial direction. As shown in FIG. 3, each annular projection 48a,b,c has a triangular cross-section which provides a gripping edge 50. The first annular projection 48a is provided closest to the axial end of the casing 12 and has the greatest height, so that it extends furthest towards the central axis of the gripping ring. The second annular projection 48b is in between the first 48a and third 48c annular projections and has a reduced height compared to the first annular projection 48a. The third annular projection 48c is provided closest to the sealing sleeve 14 and has a reduced height compared to both the first 48a and second 48b annular projections. The gripping edges 50 of the annular projections are therefore radially offset from each other.

Adjacent to each of the annular projections 48a,b,c, on the opposite side of the projection to the axial end of the casing 12 is provided an annular channel 52 extending around the inner surface 46 of the gripping ring 16.

The gripping ring 16 further comprises an annular flange 54 extending outwards from the ring in an axial direction and projecting outwards through the corresponding axial end of the casing 12. The purpose of the flange 54 will be described below.

The gripping ring 16 includes a plurality of spaced apart regions adjacent to the third annular projection 48c, each region 56 having a plurality of radially inwardly projecting teeth 56 circumferentially spaced apart around the inner gripping surface 46 of the gripping ring. The teeth 56 are provided to substantially prevent circumferential movement of the gripping ring 16 around the pipe when the pipe coupling 10 is in place.

In use, the ends of two pipes are inserted into the coupling 10 from opposite ends. With the coupling in place, the tensioning bolts 26 are tightened to clamp the coupling 10 to the pipes. As the bolts 26 are tightened, the sealing surfaces 40 of the sealing sleeve 14 are brought into sealing contact with the outer surfaces of the pipe ends. At the same time, the gripping edge 50 of the first annular projection 48a of each gripping ring 16 engages with the outer surface of the pipe end and bites into the pipe surface, thereby providing locking of the pipe end to prevent axial movement of the pipe relative to the coupling 10. In this initial position, immediately after installation, the gripping edges 50 of the second 48b and third 48c annular projections are radially offset from the outer surface of the pipe end.

As the axial loading on the pipe ends increases during use of the pipe, the outer surface 42 of the gripping ring 16 rolls against the inner surface of the web portion 30 of the casing 12 and this rolling movement, together with deformation of the gripping ring 16, causes the inner surface 46 of the gripping ring to roll relative to the outer surface of the pipe end such that first the second annular projection 48b and then the third annular projection 48c are brought into engagement with the outer surface. The respective gripping edges 50 of the annular projections 48b,c bite into the pipe surface and improve the grip of the gripping ring 16 on the pipe ends. The teeth 56 of the gripping ring 16 are additionally brought into engagement with the outer surface of the pipe ends to prevent movement of the gripping ring around the circumference of the pipe.

The rolling movement of the gripping ring 16 relative to the casing 12 is limited by the annular flange 54 which at a certain level of axial loading will abut the free edge of the flange 32 of the casing, thereby preventing any further movement of the gripping ring 16.

Where the coupling 10 is used on a pipe of a thermoplastic material such as polyethylene which exhibits 'creep' as described above, the plastic material migrates over time away from the gripping edges 50 of the annular projections 48a,b,c where the pipe is subjected to radial stress into the adjacent annular channels 52 of the inner gripping surface 46 of the gripping ring 16. This further restrains the axial movement of the pipe ends relative to the coupling 10, as described above.

It has been found that a coupling 10 as described above can perform satisfactorily for over 1000 hours under test pressures of 40 bar with pipes of chlorinated PVC, with substantially no loss of grip on the pipe. The coupling of the present invention therefore shows vastly improved gripping function compared to the prior art couplings including a frustoconical gripping ring, which when subjected to similar test conditions will typically fail within around one hour due to loss of grip on the pipe surface.

The invention claimed is:

1. A pipe coupling for connecting together the ends of two pipes, the pipe coupling comprising:
   a tubular casing for fitting around a pipe;
   tensioning means for tightening the casing around the outer surface of the pipe; and
   a dynamic axial restraint system comprising at least one resilient gripping ring mounted within the casing for gripping the outer surface of the pipe, wherein the gripping ring comprises:
      an outer convex surface engaging with an inner surface of the casing and adapted to roll against the inner surface of the casing upon axial loading of the pipe; and
      an inner gripping surface for engaging the outer surface of the pipe, wherein the gripping surface comprises a first annular projection having a gripping edge for engaging with the outer surface of the pipe in an initial position of the gripping ring and a second annular projection having a gripping edge, wherein the second annular projection is axially offset from the first annular projection and adapted such that the gripping edge of the second annular projection is brought into engagement with the outer surface of the pipe upon rolling of the outer surface of the gripping ring against the inner surface of the tubular casing whereby the area of the gripping surface in contact with the pipe increases.

2. A pipe coupling according to claim 1 wherein the gripping edge of the second annular projection is radially offset from the gripping edge of the first annular projection.

3. A pipe coupling according to claim 2 wherein the height of the second annular projection is less than the height of the first annular projection.

4. A pipe coupling according to any of claim 1 wherein the inner gripping surface of the resilient gripping ring comprises a first annular projection having a gripping edge for engaging with the outer surface of the pipe in an initial position of the gripping ring and a plurality of additional annular projections each having a gripping edge, wherein the plurality of additional annular projections are progressively offset from the first annular projection in an axial direction and adapted such that the gripping edges of the additional annular projections are progressively brought into engagement with the outer surface of the pipe upon rolling of the outer surface of the gripping ring against the inner surface of the casing.

5. A pipe coupling according to claim 4 wherein the additional annular projections are of progressively decreasing height compared to the first annular projection such that the gripping edges thereof define a substantially frustoconical gripping surface.

6. A pipe coupling according to claim 1 wherein each annular projection has a triangular cross-sectional shape, with an apex of the triangle defining the gripping edge.

7. A pipe coupling according to claim 1 wherein the inner gripping surface further comprises one or more annular channels defined behind each annular projection.

8. A pipe coupling according to claim 1 wherein the casing is of generally U-shaped cross-section having a web portion with flanges projecting radially inwardly from the axial ends of the web portion to define an annular channel, wherein the at least one resilient gripping ring is mounted in the annular channel at an axial end of the casing in abutment with the inner surface of a flange of the casing.

9. A pipe coupling according to claim 8 comprising a pair of resilient gripping rings mounted in the annular channel at opposite axial ends of the casing in abutment with the inner surfaces of the flanges of the casing.

10. A pipe coupling according to claim 8 wherein the or each resilient gripping ring further comprises an annular flange projecting out through the axial end of the casing wherein the annular flange of the gripping ring is adapted to limit the rolling movement of the outer surface of the gripping ring relative to the inner surface of the casing through abutment with the free edge of the corresponding flange of the casing.

11. A pipe coupling according to claim 1 wherein the tubular casing comprises an outer casing and an inner casing fitting inside the outer casing.

12. A pipe coupling according to claim 1 wherein the gripping ring further comprises a plurality of inwardly projecting teeth for engaging the outer surface of the pipe, wherein the plurality of teeth are circumferentially spaced around the inner gripping surface of the gripping ring to substantially prevent rotational movement of the gripping ring about the pipe axis, around the outer surface of the pipe.

13. A pipe coupling according to claim 1 further comprising a tubular sealing sleeve located within the housing.

* * * * *